July 5, 1949.　　　E. ORSHANSKY, JR　　　2,475,458
VALVE FOR HYDRAULIC UNITS
Filed Dec. 19, 1942　　　　　　　　　　　　2 Sheets-Sheet 1

INVENTOR.
Elias Orshansky, Jr.
BY
ATTORNEYS

July 5, 1949.  E. ORSHANSKY, JR  2,475,458
VALVE FOR HYDRAULIC UNITS

Filed Dec. 19, 1942  2 Sheets-Sheet 2

INVENTOR.
Elias Orshansky, Jr.
BY
ATTORNEYS

Patented July 5, 1949

2,475,458

UNITED STATES PATENT OFFICE 2,475,458

VALVE FOR HYDRAULIC UNITS

Elias Orshansky, Jr., New York, N. Y., assignor to The Acrotorque Company, Stamford, Conn., a corporation of Connecticut Application December 19, 1942, Serial No. 469,586

8 Claims. (Cl. 251—75)

This invention relates to a structurally and functionally improved hydraulic unit and more especially an hydraulic pump or motor.

In its more specific aspects, the present unit is to be employed as a motor, it being, however, distinctly understood that certain of the present teachings may be advantageously utilized in a pump. Regardless of whether such teachings are employed in an hydraulic pump or motor, it will be found that they are of especial value when either one or both of these units form a part of an hydraulic transmission.

It is a primary object of the invention to furnish a unit as afore defined in which losses incident to back pressure and trapping of liquid in valve bores or chambers will be prevented.

Another object is that of furnishing a valve primarily intended to be employed in pump or motor units which may conveniently form a part of an hydraulic transmission and by means of which leakage and friction losses will be reduced to a minimum.

With these and other objects in mind, reference is had to the attached sheets of drawings illustrating practical embodiments of the invention, and in which.

Figure 1:
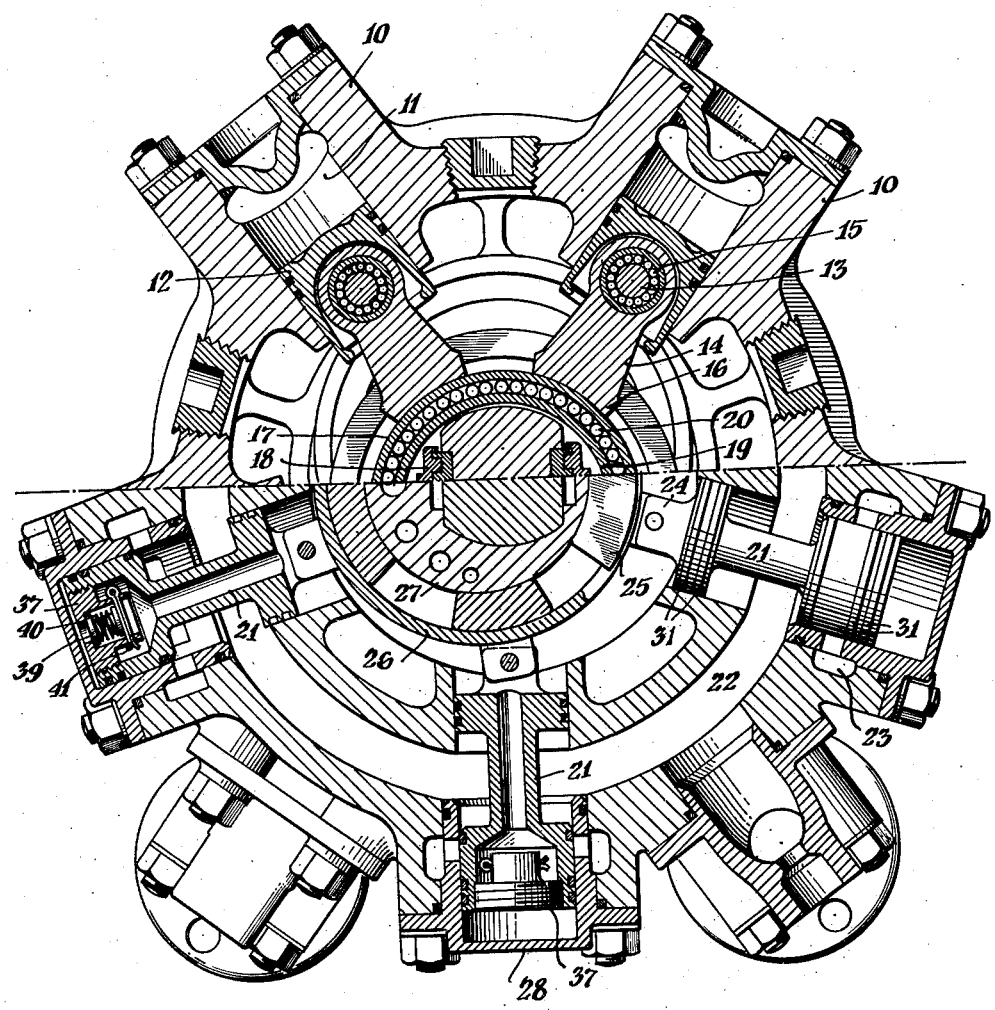
Fig. 1 is a sectional side view taken through an hydraulic unit; such section being developed along different planes.

With primary reference to Fig. 1, it will be observed that the numeral 10 indicates a casing provided with radially extending cylinder bores 11. Within these, pistons 12 reciprocate. The pistons may mount wrist pins 13 which are encircled by one end of connecting rods 14.

Transposed between the rods and the pins are bearings 15 which may be in the form of an annular series of rollers. In this manner, the connecting rods 14 will be free to oscillate with respect to the pistons 12 and with minimum friction losses, even though relatively high thrust loads are imparted to the rods.

The lower ends of the rods 14 terminate in slipper portions or elements 16, having bearing with an annular crank or eccentric 17. The degree of throw of this crank and the piston travel may be varied as desired. To this end and as indicated by the numeral 18, a mechanism such as has been shown and described in my earlier United States Patent No. 2,256,324, September 16, 1941, may be utilized. If desired, the crank or eccentric may not be adjustable. In such case, a fixed throw and piston travel will, of course, result.

Regardless of this feature, it will be observed, as in Fig. 1, that, despite the provision of the slipper elements and their relative movement with respect to the surface of member 17, a further bearing is employed. More particularly, the member 17 is concentrically disposed with respect to an inner member 19, and roller bearings 20 are transposed between these members. Thus, the latter are antifrictionally supported with respect to each other.

Assuming that this unit is employed as an hydraulic motor and that liquids of high pressure value are introduced into the cylinders, it is found that under initial starting conditions virtually no movement occurs with respect to the slipper elements or portions 16 and the member or corresponding surface or crank 17. Rather, the member 17 acts, in effect, as an integral part of the piston rods to transmit the thrusts to the member 19 through the intermediary of the bearings 20. In other words, these bearings function as anti-friction elements to cause rotation of the member 19 to occur with respect to the member 17 and to drive any shaft or equivalent unit (not shown) which is secured to the member 19.

Of course, some small amount of movement may occur between the slipper elements and the member 17 but, under initial operating conditions, it has been found that such movement is relatively inconsequential. Thus, as a general matter it may be stated that, operating from a standing start, a motor embodying the present teachings will have all movement between the crank and connecting rods occurring as a consequence of the roller bearing 20.

However, as the starting torque of the unit is overcome and as the speed begins to pick up, it will be found that a film of lubricating liquid builds up between the slipper elements and the member 17. During the establishment of this film, part of the relative movement between the piston rods and crank occurs through the antifriction bearing provided by the annular series of rollers; the remainder of the relative movement occurring between the member 17 and the slipper element 16.

As the film is finally established, and regardless of the thrust exerted by the pistons, the roller bearing will become substantially inoperative. In other words, members 17 and 19 will have no relative movements of any consequence. All movement will now occur between the outer surface of member 17 and the connecting rods.

The foregoing is true when the unit is employed as a motor. To some extent, the same effect holds true when this structure is embodied in the pump. However, I have found that, in the case of a pump—where the thrusts are transmitted from the crank to the connecting rods—in most instances this structure does not have to be resorted to. This is because the starting torque of a pump is ordinarily of sufficiently low value so that no "freezing" effect will occur between the slipper elements and the crank-eccentric. In other words, in the case of a pump, the lubricating film between the ends of the connecting rods and the eccentric will be established before thrust values of a high order will have come into existence.

As before brought out, however, the preceding teachings might be employed in either a pump or a motor unit; although of especial value when employed in connection with the latter. In such adaptation, friction losses are reduced to a minimum under starting and running conditions; bearings ideally adapted for use in either of these connections having been provided.

I do not claim herein, specifically, the use of the hereinbefore-described anti-frictional assembly including roller bearings 20 for minimizing friction, particularly during the starting phase of the mechanism, as such is claimed in my co-pending application Serial Number 566,103 filed December 1, 1944, since abandoned.

It will be understood that a unit of this character—and regardless of whether it be a pump or motor—will have associated with it valves for controlling the flow of liquid into and from the cylinders. Valves suitable to this use have been illustrated in the lower portion of Fig. 1. As will be seen, they include spool type bodies 21. These bodies may extend across a manifold 22 and passages 23. Stems or operating portions 24 form parts of the valves and conveniently have operating elements 25 connected with them. These elements are acted against by retaining rings 26 and a cam or eccentric 27, which is coordinated in operation with eccentric 17 through mechanism 18 for providing the customary phase shift in operating sequence of associated piston 12 and valve body 21, respectively. Consequently, as the rings and cam rotate, the valves will be caused to reciprocate. This will result in communication being established and interrupted between the manifold 22 and passages 23 to control the flow of fluid into and from the cylinders.

As has also been illustrated, the ends of the bores within which the valves are disposed may conveniently be closed by heads 28. Despite every expedient, it is apparent that a certain amount of seepage of liquid will occur in the space between the valve ends and these head portions. Such seepage will become trapped liquid, resulting in back pressure being built up, unless the liquid is permitted to escape. The mere provision of passages is not adequate to allow of such escape, because liquid would flow from the sump through such passages into the chambers beyond the valves bodies, rather than solely from such chambers to the sump portion. This would result in pumping, with consequent losses.

Figure 4:
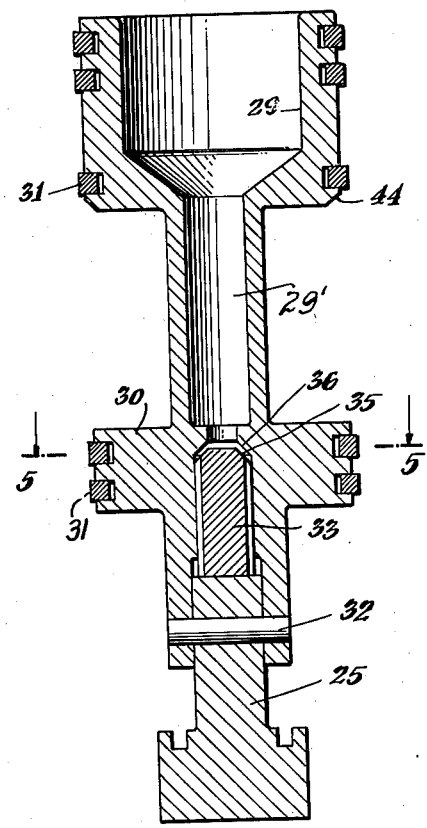
Fig. 4 is a view similar to Figs. 2 and 3 but showing a still further form of valve.
Figure 5:
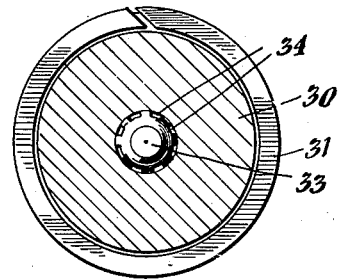
Fig. 5 is a transverse sectional view taken along the lines 5—5 and in the direction of the arrows as indicated in Fig. 4.

To overcome this, subsidiary valves are—according to my invention—associated with the main valves. These valves may take numerous different forms as shown in detail in Figs. 2, 3 and 4. In these views the numerals 29 and 30 indicate the enlarged portions of the valve body, each portion of which mounts packing in the form of piston rings 31. As will be appreciated, portions 29 and 30 provide for a balanced structure. More particularly, as shown in Fig. 4, portion 29—as afore brought out—controls the flow of liquid to and from the cylinders. Portion 30, in addition to serving as a guide, equalizes the pressure effect so that the valve may be moved with minimum effort. The body of the valve, as well as the stem, is provided with a bore 29' affording communication with the sump. As will be noted in this view as well as in Fig. 2, the operating element may be pivotally attached to the stem as at 32. Regardless of this, however, there is supported within a portion of the bore 29' a subsidiary valve element 33 which may have its lower end capable of bearing against the upper end of element 25. As shown especially in Fig. 5, the face of element 33 may be formed with an annular series of grooves indicated at 34. The upper edge of body 33 may be shaped to define a valve portion or surface 35 capable of cooperation with surface 36 formed in the bore and which latter surface functions as a valve seat. Due to one or more of the factors of air pressure, inertia and oil splash, the valve body normally tends to seal bore 29' against the passage of fluid. Such seal will be maintained against any flow occurring from the sump outwardly through the bore. However, should liquid be trapped between the valve and the head, it will exert a force against the upper end of body 33, unseating the same. The liquid may thereupon flow along the grooves 34 back to the sump. Accordingly, liquid will not become trapped and exert back pressure.

Figure 2:
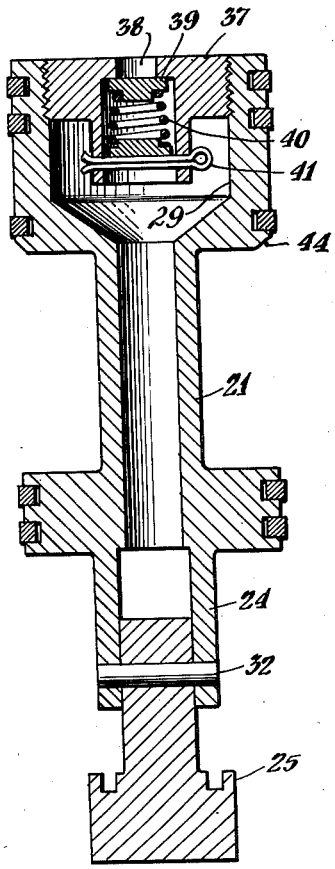
Fig. 2 is an enlarged sectional view of the form of valve as employed in Fig. 1.

The same result is achieved by the valve structure shown especially in Fig. 2 and in which it will be seen that a screw threaded plug 37 is mounted in the upper end of the bore and especially within the head portion 29 of the valve. This plug is formed with a passage 38 normally closed by a valve 39 under the influence of a spring 40. The latter is maintained in assembled position conveniently by a cotter pin 41.

Figure 3:
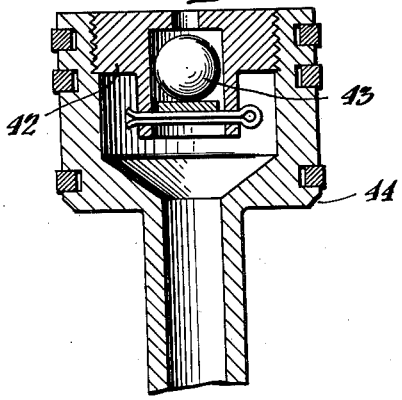
Fig. 3 is a fragmentary sectional view of a second form of valve which may be utilized in lieu of the assembly shown in Figs. 1 and 2.

A further form of valve is shown in Fig. 3, in which a plug 42 corresponding substantially to the plug 37 is employed. A ball valve 43 may—as a consequence of inertia, oil splash and/or air pressure—normally prevent a flow of fluid from the sump outwardly through the valve body. A cotter pin may, in this form, also serve to retain the ball in position.

Regardless of the type of subsidiary valve employed, it will be seen that the desired results are achieved. With respect to the main valve, it is to be observed that due to its spool type of structure, a balanced unit is furnished. Also, as a consequence of the piston rings employed, minimum leakage losses will occur and also minimum friction losses will be encountered.

Finally, it will be noted, as shown in Figs. 2 to 4 inclusive, that the edge portion of the valve body may be reduced as indicated at 44. In other words, a tangentially extending surface is furnished such that proper cooperation with the bore surfaces and adjacent passages and manifolds is assured.

Thus, among others, the several objects of the invention have been achieved. Obviously, nu-

I claim:

1. In a valve mechanism for a hydraulic translating device, a working fluid circuit for said device under control of said valve mechanism, a sump in said working fluid circuit, a valve cylinder having a bore with a port in the side wall thereof serially disposed in said fluid circuit, a wall at the end of said bore, a piston movable in said bore for controlling flow of fluid in said circuit, said port being closed and opened as said piston moves past said port, and means for actuating said piston, said piston having a one-way passage therethrough for restoration to said sump of seepage fluid trapped between said piston and said end wall.

2. A valve for a hydraulic transmission unit comprising, in combination, a cylinder having a smooth surfaced valve-receiving bore, a wall defining the end of said bore, and a valve body reciprocatingly movable within said bore, said body being formed with a one-way passage for the flow of liquid trapped between the body and said end wall.

3. A valve for controlling liquid flow into and from a cylinder of a hydraulic transmission unit of the type wherein a piston is reciprocable within the cylinder comprising, in combination, a valve cylinder having a smooth surfaced bore, a wall defining the end of said bore, a body adaptable for reciprocating movement within said bore, said body having a passage for the flow of liquid trapped between said body and said end wall, and a subsidiary valve within said body for controlling the flow of said trapped liquid through said passage.

4. A single acting valve for a hydraulic transmission unit comprising, in combination, a cylinder having a smooth surfaced valve-receiving bore with a port in the side wall thereof for passage of liquid therethrough, a wall defining the end of said bore, a valve body including a head at one end thereof reciprocatingly movable within said bore, said port being closed and opened as said valve body reciprocates past said port, said body being formed with a passage for the flow of liquid trapped between its head and said end wall, and a check valve carried by said valve body, said check valve being disposed within said passage for preventing flow of liquid out of the passage towards said end wall.

5. A single acting valve for a hydraulic transmission unit comprising, in combination, a cylinder having a smooth surfaced valve-receiving bore with a port in the side wall thereof for passage of liquid therethrough, an enclosed portion defining the end of said bore, a valve body including a head at one end thereof movable within said bore, said port being closed and opened as said valve head moves past said port, said body being formed with a passage for the flow of liquid trapped between its head and said end portion, and a further valve for controlling the flow of liquid through said passage, said further valve comprising a spring-pressed valve body having a seat therefor.

6. A valve for a hydraulic transmission unit of the piston-displacement type comprising, in combination, a valve member having a smooth surfaced bore with a port in the side wall thereof for passage of liquid therethrough, an enclosed portion defining the end of said bore, a valve body projectible into said bore, said port being closed and opened as said valve body moves past said port, said valve body being of "spool" configuration and being formed with a one-way passage for the flow of liquid trapped between said body and said end portion.

7. A valve for a hydraulic transmission unit of the piston-displacement type comprising, in combination, a member having a smooth surfaced valve-receiving bore with a port in the side wall thereof for passage of liquid therethrough, an enclosed portion defining the end of said bore, a valve body reciprocable within said bore, said port being closed and opened as said valve body reciprocates past said port, said valve body being of "spool" configuration and being formed with a one-way passage for the flow of liquid trapped between its end and said end portion, and a piston ring on said valve body in contact with the surface of said bore.

8. A valve for controlling liquid flow into and from a cylinder of a hydraulic transmission unit of the type wherein a piston is reciprocable within the cylinder comprising, in combination, a member having a smooth surfaced valve-receiving bore with a port in the side wall thereof for passage of said liquid therethrough, an enclosed portion defining the end of said bore, a valve body including a head at one end thereof reciprocable within said bore, said port being closed and opened as said valve head reciprocates past said port, said valve body being of "spool" configuration and being formed with a passage for the flow of liquid trapped between its head and said end portion, a piston ring on said valve body in contact with the surface of said bore, and a further valve for controlling the flow of liquid through said passage.

ELIAS ORSHANSKY, JR.

REFERENCES CITED

The following references are of record in the file of this patent:

UNITED STATES PATENTS

| Number | Name | Date |
|---|---|---|
| 15,960 | Bradley | Oct. 28, 1856 |
| 329,736 | Harvy | Nov. 3, 1885 |
| 816,245 | McElroy | Mar. 27, 1906 |
| 1,137,877 | Money et al. | May 4, 1915 |
| 1,326,358 | MacGregor | Dec. 30, 1919 |
| 1,411,717 | Frost | Apr. 4, 1922 |
| 1,479,075 | Johnson | Jan. 1, 1924 |
| 1,775,856 | Hauser | Sept. 16, 1930 |
| 1,871,965 | DuBois | Aug. 16, 1932 |
| 1,887,078 | Wheaton | Nov. 8, 1932 |
| 1,940,990 | Ball | Dec. 26, 1933 |
| 1,964,245 | Benedek et al. | June 26, 1934 |
| 2,046,759 | Wheaton | July 7, 1936 |
| 2,108,534 | Herrmann | Feb. 15, 1938 |
| 2,194,209 | Mott | Mar. 19, 1940 |
| 2,215,488 | Svenson | Sept. 24, 1940 |
| 2,237,114 | Read | Apr. 1, 1941 |
| 2,279,645 | Sinclair | Apr. 14, 1942 |
| 2,336,653 | Taylor | Dec. 14, 1943 |

FOREIGN PATENTS

| Number | Country | Date |
|---|---|---|
| 653,441 | France | 1928 |